|  US009693220B1 |

(12) United States Patent
Daniel (10) Patent No.: US 9,693,220 B1
(45) Date of Patent: Jun. 27, 2017

(54) SYSTEM AND METHOD OF USING DUAL SUBSCRIBER IDENTIFICATION MODULES FOR ADVERTISING

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 15/043,258

(22) Filed: Feb. 12, 2016

Related U.S. Application Data (60) Provisional application No. 62/115,425, filed on Feb. 12, 2015.

(51) Int. Cl.
*H04W 12/08* (2009.01)
*H04W 8/18* (2009.01)
*H04W 88/02* (2009.01)

(52) U.S. Cl.
CPC ........... *H04W 8/183* (2013.01); *H04W 12/08* (2013.01); *H04W 88/02* (2013.01)

(58) Field of Classification Search
CPC ............................... H04W 8/12; H04W 24/02
USPC .................... 455/558, 556.1, 67.11
See application file for complete search history.

(56) References Cited

U.S. PATENT DOCUMENTS

| 8,787,879 | B2 | 7/2014 | Daniel |
| 2002/0154632 | A1 | 10/2002 | Wang et al. |
| 2005/0232186 | A1 | 10/2005 | Karaoguz et al. |
| 2010/0279698 | A1 | 11/2010 | Wong |
| 2011/0222549 | A1 | 9/2011 | Connelly et al. |
| 2012/0115493 | A1 | 5/2012 | Matada et al. |
| 2012/0166261 | A1* | 6/2012 | Velusamy .......... G06Q 30/0225 705/14.16 |
| 2016/0037339 | A1* | 2/2016 | Kavalathara .......... H04W 12/06 455/411 |
| 2016/0226922 | A1* | 8/2016 | Russell ............... H04L 65/1016 |

OTHER PUBLICATIONS

International Search Report, Int'l Application No. PCT/US14/46520, Apr. 6, 2015, 2 pages, ISA/US.

* cited by examiner

*Primary Examiner* — John J Lee
(74) *Attorney, Agent, or Firm* — Alberto Interian, III, Esq.

(57) ABSTRACT

A system that includes a processor, a communications means connected to the processor, wherein the communications means is operative to connect to a wireless communications network, a means for accepting two subscriber identification modules ("SIM"), and computer executable instructions readable by the processor, and operative to determine whether a local SIM and a second SIM are present in the means for accepting two SIMs, wherein the local SIM is assigned to a traditional phone number and the second SIM is used to receive or transmit communications to or from the advertisers, where the second SIM card is accessed through an application program ("app"). By downloading the app, the user can access a suite of various application programs, programs and/or advertisements that are accessible through the second SIM card.

17 Claims, 5 Drawing Sheets

SYSTEM AND METHOD OF USING DUAL SUBSCRIBER IDENTIFICATION MODULES FOR ADVERTISING

PRIORITY CLAIM

This patent application program is a Non-Provisional patent application program and claims priority under 35 U.S.C. §119(e) to United States Provisional Patent Application program Ser. No. 62/115,425, titled "System and Method of Using Dual SIM Card for Advertising" filed Feb. 12, 2015. The entire disclosure of the afore-mentioned patent application program is incorporated by reference as if fully stated herein.

FIELD OF THE INVENTION

A system that includes a processor, a communications means connected to the processor, wherein the communications means is operative to connect to a wireless communications network, a means for accepting two subscriber identification modules ("SIM"), and computer executable instructions readable by the processor, and operative to determine whether a local SIM and an second SIM are present in the means for accepting two SIMs, wherein the local SIM is assigned to a traditional phone number and the second SIM is used to identify user for communications received or transmitted to or from the advertisers, where the second SIM card is accessed through an application program ("app"). By downloading the app, the user can access a suite of various application programs, programs and/or advertisements that are accessible through the second SIM card.

DESCRIPTION OF THE PRIOR ART

Many developing countries are using dual SIM cards as standard practice to accommodate dual purposes for phones, providing a separation between professional and personal use. This allows users to communicate with their friends, family, and co-workers, and access the internet and e-mail as well, when data plans are purchased. Except in many of those countries where dual SIM cards are popular, data plans can be so high they are cost prohibitive for the general population. The high cost for data plans is also an issue in developed countries as many users are reluctant to purchase huge data plans to utilize the full capacity of mobile devices technology offerings.

This limits how people use their cellphones and places a restriction on their downloads, minimizing downloads to absolute necessity in order to ensure that their data consumption falls well within their data plans and no overage fees are incurred. Except much of today's advertising, entertainment and e-commerce involves downloads, so the advertisers are restricted in promoting their messages and the users lose out in experiencing high-tech advertising and promotions. Thus there needs to be an efficient system and method for businesses to market and promote their products and promotions, etc., in a manner that will be cost efficient for the users.

Additionally, in a high tech society where marketing relies heavily on visual presentations, business owners are consistently looking for appealing ways to market their products and services in new and novel manner. This invention satisfies these long felt needs in a new and novel manner and solves the foregoing problems that the prior art has been unable to resolve.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

SUMMARY OF THE INVENTION

The system and methods disclosed herein are directed to use of dual subscriber identification modules ("SIM"), i.e. a local SIM and a second SIM, wherein the local SIM is assigned to a traditional phone number and is enabled for identifying the user for the receipt, transmittal and/or executing of the various communication functions for mobile devices as are generally known and used in the arts. In some embodiments, the second SIM shares the same traditional phone number or may be assigned a separate phone number, and is enabled for selective activation by the user, wherein the user may selectively use the second SIM for receiving or transmitting communications to or from the advertisers.

The second SIM card is accessed through an application program ("app") and enables an established relationship with for instance the advertiser as user may use the app to access and or download multimedia content using the second SIM, where user's identity, browsing of content and/or downloads are tracked and traceable to user. By downloading the app, the user can access a suite of various application programs, programs and/or advertisements that are accessible through the second SIM card and downloads stored in a separate segmented memory portion where the user's use and consumption of the segmented memory portion for storage of downloaded multimedia content is monitored and tracked by the processor for billing purposes. Based on the tracking of user's data usage of the segmented portion of memory, dynamic and/or periodic adjustments (adding or reducing) of the allocated amount of data storage for the at least once user based on the user's use of the second SIM and/or content downloaded may occur. The advertisers may pay an advertising fee for advertising using this system and method, such that the advertising fees cover the cost for user's data storage and/or overages, accessibility and data consumption, making it either free for the user or at a minimal cost. In some embodiments, the more data storage consumed by the user's downloads, i.e. indicating active downloads, the more data storage will be granted to the user. In some embodiments, the reciprocal is true, i.e. the less data storage used by the user, the maximum data storage previously allocated to the user will be reduced to more appropriately match the user's use. In this manner, data storage is allocated to the plurality of users to where it's needed most, without waste.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Figure 1:
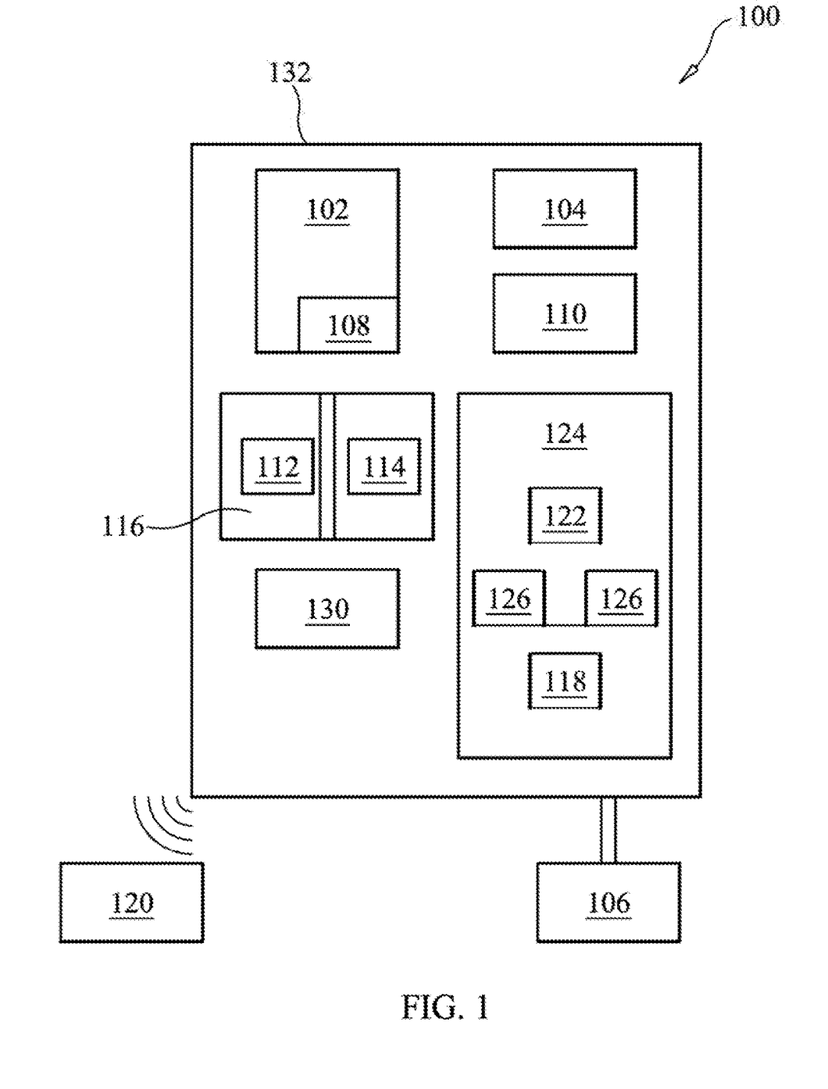
FIG. 1 shows a system in accordance with one embodiment of the invention.

FIG. 1 shows a system 100 in accordance with one embodiment, wherein system 100 comprises at least one computer processor 102; at least one communication module 104 electronically connected to the at least one processor 102, wherein said at least one communication module 104 is operative to connect to a wireless communications network 106; and computer executable instructions 108 executable by the at least one processor 102, which when executed causes the processor 102 to perform any one or more of the following: activating a detection module 110 for detecting whether both at least one local SIM 112 and a second SIM 114 are present in at least one means for accepting a plurality of SIMs 116, wherein the at least one local SIM 112 is enabled for traditional voice and data communications and the second SIM 114 is enabled for communications to for example, an advertiser wherein the communications comprising multimedia content specifically directed to or from the second SIM 114 and wherein both the local SIM 112 and the second SIM 114 are operable for communicating simultaneously without having to extract and/or replace either SIM 112, 114 from the at least one means for accepting a plurality of SIMs 116; receiving a command for selective activation of an application program 118, wherein upon activation, starting an active communication session 120 based on the detecting of both SIMs 112, 114, wherein for the duration of the communication session 120, the at least one processor 102 tracks all incoming and outgoing communications by the communication module 104, and encode the outgoing data communications requests and incoming data communications responsive to the outgoing communication requests that are directed to/from the second SIM 114, with the second SIM's 114 unique encoding number, and based on the tracking, enabling the at least one communication module 104 to route all electronic communications that include the second SIM's 114 encoding number to the second SIM 114; and for the duration of the communication session 120, storing multimedia content downloads that include the second SIM's encoding number to a separate segmented portion 122 of memory 124, while enabling any remaining communications that occur during the communication session 120 that does not include the second SIM's 114 encoding number to be processed accordingly by the local SIM 112, i.e. without requiring the user to extract and/or replace either SIM 112, 114 from the means for accepting a plurality of SIMS 116; and tracking data usage of the segmented portion 122 of memory 124 and automatically, dynamically and/or periodically adjusting an allocated amount of data storage of the segmented portion 122 of memory 124 based on the data usage that is being tracked. In this manner, user benefits from not compromising his/her data plan as the user's downloads are separately tracked, billed and stored in the segmented portion 122 of memory 124 that is specifically designated for storing the multimedia downloads for which the advertiser either wholly pays for user's data usage, any excesses or the user may pay a nominal fee. As such the fee relationship is primarily between the user and the advertiser, while the telecommunications provider provides the network for the advertising communications platform.

The term "module," as used throughout this disclosure, may refer to a unit of distinct functionality that may be presented in software, hardware, and/or combinations thereof. When the functionality of a module is performed in any part through software, the module includes a machine readable medium. In one embodiment of the invention, these computer modules may be self-contained computer hardware resident on the computer processor 102 or resident on a network enabled mobile computing device, e.g. a mobile phone. In another embodiment of the invention, computer modules may be computer hardware on a designated computer chip or separate computer chips. In yet another embodiment of the invention, the processor 102 may include computer processing module 126, and an instruction module 128, wherein the processing module 126 may be configured to perform others tasks not undertaken by the other modules. In a further embodiment of the invention, the computer modules may be hardware resident on one chip, component, separate components or any combination thereof. In yet another embodiment of the invention, processing module 126, instruction module 128, display module 130 and/or the various modules disclosed herein may all be in electronic communication with computer processing module 126.

Computer central processor 102 may comprise any type of processor, such as, but not limited to, a mobile device's processor, a computer processor, a server processor, a central processing unit (CPU), a microprocessor, a video processor, a front end processor, a coprocessor, a single-core central processor, a multi-core processor, and the like. Processor 102 may be operative to communicate electronically with the various modules disclosed herein and throughout the present disclosure, and the like. Said electronic communication may comprise any type of electronic communication, such as a network communication, a direct communication, an indirect communication, a wired communication, a wireless communication, and the like.

Processor 102 includes a processing module 126 that may comprise of a hardware aspect such as a computer processor 102, including, but not limited to, any of those previously described herein and throughout the present disclosure. In some embodiments, processing module 126 may comprise of a software aspect, such as, but not limited to, a computer program, such as an operating system, and the like that may be stored in memory 124. In yet another embodiment, processing module 126 may comprise both hardware and software aspects, such as those described directly above and elsewhere throughout the present disclosure. In some embodiments, processing module 126 may include software, e.g. computer software program, and hardware components to, for example, determine whether at least one local SIM 112 and a second SIM 114 are present in the at least one means for accepting a plurality of subscriber identification modules, wherein the at least one local SIM 112 is enabled for traditional voice and data communications and the second SIM is enabled for dedicated data communications directed to advertisers that comprises multimedia content that may be stored on a segmented portion 122 of memory 124 specifically designated and reserved for said multimedia content; preventing access to the segmented portion 122 of memory 124 if the second SIM 114 is not present in the at least one means for accepting a plurality of subscriber identification modules 114.

At least one communications module 104 may comprise of any type of communications means, that includes hardware and enabling software such as a transceiver and further including, but not limited to, a wireless communications means or wired communications means, such as a GSM modem, a WiFi module, a Bluetooth module, a Zigbee module, and any other type of communications means used to communicate directly with another device, or indirectly with another device, such as through a local or wide area network 106. In yet another embodiment, at least one communications module 104 comprises a communications means for accessing a cellular network, such as a GSM network, a data network, such as a local data network, or a wide area data network, such as the Internet.

In yet another embodiment, at least one communications module 104 comprises a communications means for accessing a cellular network, such as a GSM network, a data network, such as a local data network, or a wide area data network, such as the Internet. In yet another embodiment, at least one communications module 104 comprises a communications means for accessing a web-enabled device, such as a Bluetooth module for accessing a web-enabled smartphone.

System 100 may comprise of at least one mobile device 130, which houses the at least one processor 102, at least one display module 130, at least one communications module 104, the local SIM 112, second SIM 114 and the means for accepting a plurality of SIMs 116. Mobile device 130 may be a mobile phone, a tablet PC, a mobile PC, a smart phone, or a standalone mobile device, and the like.

At least one display module 130 may comprise of computer executable instructions 108 in conjunction with at least one display devices. Display device includes but is not limited to, an electronic display device that include a display that displays and/or publishes data, such as a liquid crystal display (LCD), a plasma display, or a light emitting diode (LED) display. In some embodiments, at least one display device may comprise of a touch-screen, television, a computer, computer monitor, a projector, remote control, a telephone, a portable digital assistant, a networked enabled mobile communication device, and/or any other kind of screen and/or display device. In some embodiments, display module 130 is electronically connected to processor 102. In other embodiments, display module 130 is wirelessly connected to processor 102. In yet further embodiments, display module 130 may include control or user input means, such as, but not limited to, a touch screen, a stylus, and the like that may be used to activate and/or interact with the application program 118.

In some embodiments, at least one processor 102 is connected to or integrated into a mobile device 130, such as a mobile phone. In some embodiments, the computer executable instructions 108 may be stored locally, in whole or in part, such as in the mobile communications device's memory 124 such as computer readable media that includes but is not limited to, a hard drive, a solid state drive, a flash memory, random access memory, CD-ROM, CD-R, CD-RW, DVD-ROM, DVD-R, DVD-RW, and the like. The multimedia content downloads are stored in memory 124 in a segmented portion 122, specifically designated and accessed by the processor 102 for storing the same. User therefore has the convenience of reviewing the multimedia content at his/her leisure on his/her mobile device via the application program 118 as retrieved by the processor 102. Advertisers also benefit as they can direct targeted advertisements to the user based on his/her user habits as the user's access, use, data consumption and/or storage of the content as accessed via the second SIM 114 is being tracked and identified by the second SIM 114.

Computer executable instruction 124 may be any type of computer executable instruction 124, which may be in the form of a computer program, the program being composed in any suitable programming language or source code, such as C++, C, JAVA, JavaScript, HTML, XML, and other programming languages. In other embodiments, the computer executable instructions 108 may be stored remotely, in whole or in part, such as in a central station. The central station may be a cellular telephone/data service provider. Computer executable instructions 108 may take the form of a downloadable application program, such as, but not limited to a mobile application program. In some embodiments, a user may be provided with at least one local SIM or second SIM card, as well as access to a downloadable application program 118. In another embodiment, the user may be provided access, or rights to purchase, the downloadable application program 118, and upon purchasing, downloading, or accessing the application program 118, may be provided a local and/or second SIM card.

System 100 further comprises detection module 110 that comprises of processor 102 and computer executable instructions 108 that may be stored in memory 124 or in the instruction module 128, which when executed causes the processor 102 to enable the detection module 110 to detect the presence of both the local SIM 112 and the second SIM 114 within the at least one means for accepting a plurality of subscriber identification module 116.

Local SIM 112 may be assigned a traditional phone number. In some embodiments, the traditional phone number comprises a traditional already existing country code, area code, and city number. In some embodiments, second SIM 114 shares the same traditional phone number as the local SIM 112, in which case the system's processor 102 may generate and assign a unique encoding number for all communications that are directed to and/or originate from the second SIM 114, when the second SIM 114 has been selectively activated for a communication session 120. In some embodiments the generated assigned unique encoding number may be dynamic, i.e. a newly created random number for each active communication session 120 that may include date and time stamp, while in other embodiments the generated assigned unique encoding number is assigned by the processor 102 at the initial setup of the application program and once generated is repeatedly assigned for all second SIM 114 communications.

In some embodiments, the second SIM 114 is similar in function to the local SIM 112 that is traditionally used in mobile communication devices, and has its own unique telephone number that is used for encoding the outgoing data communications requests and incoming data communications responsive to the outgoing communication requests that are directed to/from the second SIM 114 based on the tracking of the communications. The issuer of the second SIM 112 may be the advertiser or the main operator of the advertising platform for accessing the suite of advertisements using the second SIM 114.

In yet another embodiment, the second SIM's unique telephone number may be issued in accordance with the geographical location of the user, i.e. sharing the same area code, wherein use of the second SIM 114 will at a minimum be local to the geographical area where the local SIM 112 is issued. Communications that are tagged by the processor 102 with the second SIM's 112 unique telephone number are tracked for data usage of the segmented portion 122 of memory 124 such that any automatic, dynamic and/or periodic adjustments can be made. The second SIM 114 is also configured for accessing third party multimedia advertising content (collectively "multimedia content") that may be located remotely on a website accessible by a Uniform Resource Locator ("URL") over a communications network. User's use of the data storage accessed by the second SIM 114 may be monitored by the operator/provider of the second SIM 114, wherein the costs may be absorbed by the advertiser.

Figure 2:
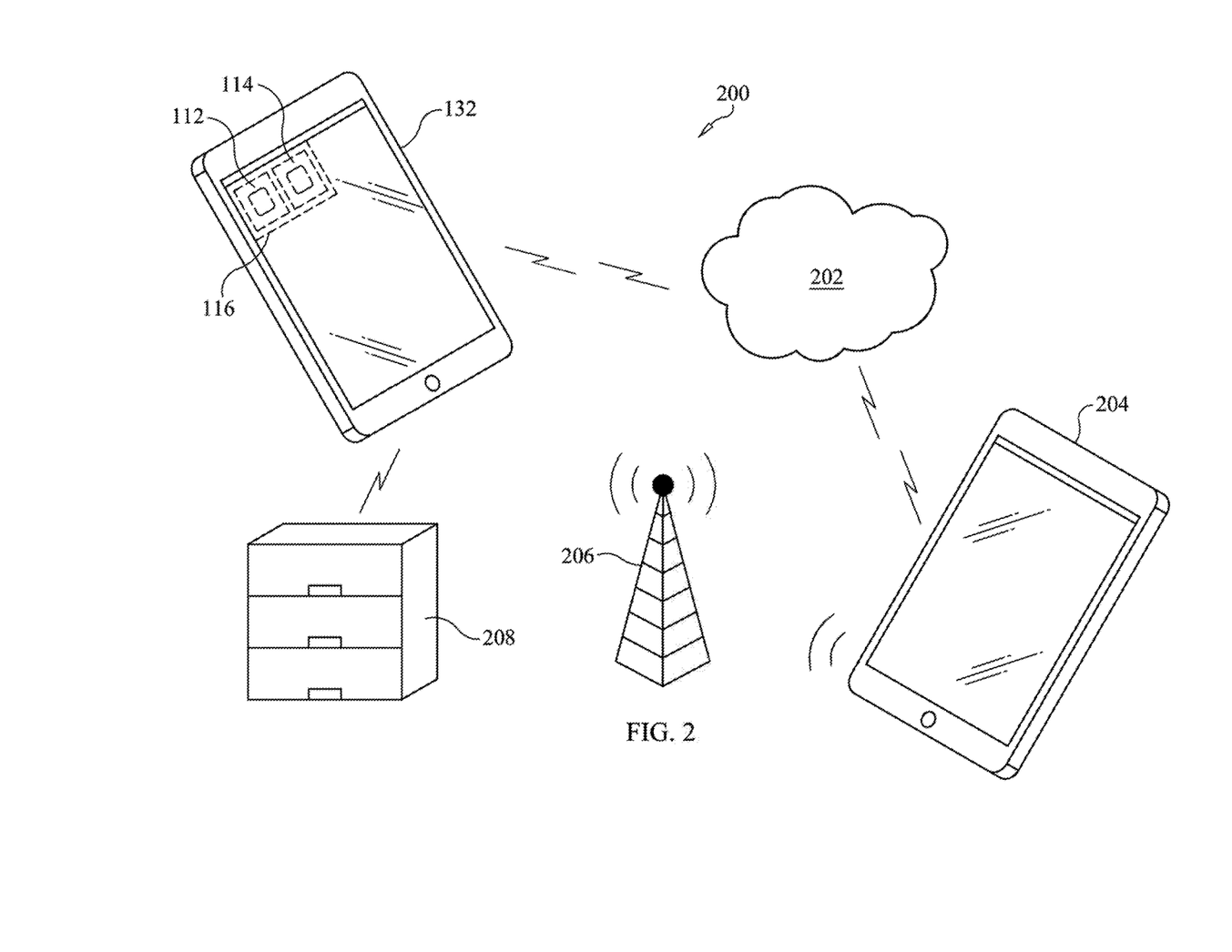
FIG. 2 shows a system in accordance with one embodiment of the invention.

In some embodiments, both the local SIM 112 and the second SIM 114 are required to be present in the at least one means for accepting a plurality of SIMs 116 in order for the application program and/or the second SIM 114 to be able to access data stored in the segmented portion 122 of memory 124 and/or the operability of the second SIM 114 to be operable for accessing multimedia content from the advertiser via the application program 118. Furthermore, by requiring that both the local SIM 112 and the second SIM 114 be present in order to use the system 100 to communicate via the second SIM 114 ensures that the second SIM 114 is not used to circumvent a telecommunications service provider's charges as the networked communication device that includes the local 112 and second DIM 114 will still need telecommunication services from a telecommunications service provider. Users and/or cellular telephone/data service providers may be required to register in order to enjoy the benefits of the systems 100, 200 and methods described herein utilizing the second SIM 114.

In some embodiments, the more data storage consumed by the user, i.e. indicating active downloads, the more data storage will be granted to the user. In some embodiments, the reciprocal is true, i.e. the less data storage used by the user, the maximum data storage previously allocated to the user will be reduced to more appropriately match the user's data usage consumption. In this manner, data storage is allocated to the plurality of users to where it's needed most, without waste. In some embodiments, advertisers pay an advertising fee for advertising using this system 100 and method, such that the advertising fees cover the cost for user's data storage, accessibility and data consumption, making it free for the user.

The local 112 and/or second SIM 114 are housed in the at least one means for accepting a plurality of subscriber identification modules 116 that may comprise a traditional subscriber identification module (SIM) card tray, or multiple SIM card tray, such as a dual-SIM card tray. In some embodiments, local 110 and second SIM 114 may comprise of traditional SIM cards, micro SIM cards, nano SIM cards, or any other type of subscriber identification modules known in the art. Users can use their local dual-SIM card mobile device 132 to access two lines of data and voice (i.e. two separate data plans even if they share the same telephone number). Where local and/or roaming charges generally apply and local wireless network communications services are provided by a local cellular telephone/data service provider (e.g. AT&T, Verizon, Sprint, etc.), the second SIM 114 is still active and is configured for working in tandem with the local SIM 112.

Processor 102 enables a detection module 110 for detecting the presence of the second SIM 114, analyze incoming and outgoing electronic communications, data requests, notes, editing, data and file processing (editing, copying, deleting, etc.), multimedia processing control commands and the like (collectively "electronic communications"), isolating voice and data communications or directed to the local SIM 112 and channels these communications to the at least one local SIM 112, and channels the remaining electronic communications ("multimedia communications") to the second SIM 114 when the second SIM 110 has been selectively activated for communicating via an active communication session 120. Since both SIMs 112, 114 are present in the means for accepting a plurality of SIMs 116, an active communication session 120 invokes the processor 102 to monitor all incoming and outgoing communications, placing the communication session in foreground processing. However, communications with the second SIM does not terminate the local SIM 112 from receiving, for example, voice communications, but will instead revert the priorities as the processor 102 swaps the communication session 120 to the background and provides notification via the displaying module 120 to the mobile device's display of the incoming voice communications. As such, a user may pause any downloads and/or communications with the advertising server to receive the incoming voice communications and resume the communications (and/or downloads) once the voice communication using the local SIM 112 is terminated. Any downloads by the second SIM 114 as stored in the segmented portion 122 of memory 124 are retrievable by the processor 102.

The at least one computer processor 102 includes computer executable instructions 108 readable and executable by the computer processor 102 and configured for launching the application program 118, which may be stored in the memory 124, also comprises of computer executable instructions, executable by the at least one computer processor 102, and configured for initializing and terminating a communication session 120, and for notifying the processor 102 of the second SIM 114 being used for any such communications such that the processor 102 can specifically direct any downloads to the segmented portion 122 of memory 124. Application program 118 may be selectively activated by an application program icon (e.g. by touching a touchscreen, or selecting it using a pointing device, roller ball, arrow keys, or other controller or using other control means), where upon selection, the computer central processor 102, launches the application program 118 and the computer processor 104, which is electronically connected to the display, controls the display module 130 to display the application program 118 as launched on for instance a display on the at least one mobile device 130.

Application program 118 may comprise in part of a browser, such as for use on the mobile device 132, or a similar browsing device. Application program 118 may be any type of software application program, such as a stand-alone application program designed to run on a mobile platform, such as a mobile device running an operating system, such as iOS™ Android™, Windows Mobile™, Blackberry™, and the like. Application program 118 may be operative for an iPhone, any other "smart phone," mobile device, cellular phone, PDA, GPS or any other mobile device 132 capable of handling electronic transactions dealing with dynamic content, object, application program, or software. In some embodiments, application program 118 may reside on a server computer and may be downloadable from the computer server or otherwise reside in the mobile device's local memory means 124. For example, in one embodiment, the application program 118 may be on a mobile device (such as an iPhone, Blackberry, or other "smart phone") and the full-sized software program may be on a computer server, where communications to and from the advertiser occurs over a network or directly, either wired or wirelessly.

Referring now to FIG. 2, a system 200 is shown in accordance with one embodiment, wherein system 200 comprises a first mobile device 132 operative to connect to any one or more of the following: a local wireless communications network 202, a second mobile device 204 operative to connect to a mobile communications network 206, and at least one advertising server 208 operative to connect to a communications network 208, and to connect to the first mobile device 132.

In one embodiment, first mobile device 132 comprises any type of mobile communications device, such as a mobile phone, a smartphone, a tablet PC, a laptop PC and the like. First mobile device 132 includes a local SIM 112 and a second SIM 114 positioned within the means for accepting a plurality of SIMs 116. It is understood that in some embodiments of the invention, the means for accepting a plurality of SIMs 116 may house more than two (2) SIMs, i.e. a plurality of SIMs, wherein each SIM may be programmed for designated system functions. The first 126 and second mobile devices 204, may be operative to connect to and/or receive voice and data communications from each other, e.g. connecting either wirelessly, such as through Bluetooth® or WiFi or via a local wireless communications network 202, a mobile communications network 206, or global communications network 208. In some embodiments, global communications network 208 may comprise the world-wide-web or the Internet. Local wireless communications network 202 may comprise a Wi-Fi network supplied by a WiFi or other wireless network router. Mobile communications network 206 may comprise a cellular communications network, such as a GSM or CDMA network.

In some embodiments, the second SIM 114 may not be required to be present in the means for accepting a plurality of SIMs 116 in order for the local SIM 112 to be operative.

In some embodiments, both the local SIM 112 and second SIM 114 are required to be present in the means for accepting a plurality of SIMs 116 in order for the second SIM 112 to be operative.

In some embodiments, some of the features of second SIM 112 may be deactivated (as in restricted or prohibited), which may include calling functions over cellular phone networks, data transfer, and the like (unless the application program 118 has been selectively launched, thereby initiating an active communication session 120 for using the second SIM 114). In deactivating selective functions, the first mobile device 132 is therefore operative to function as a traditional mobile device with a singular SIM (i.e. send or receive communications, such as voice, text, audio-visual, or data communications), where all the pertinent SIM initiated and/or related functions are controlled by the local SIM 112.

A user of the first mobile device 132 may use his/her mobile device 130 that includes the local SIM 112 enabled for use with voice and data communications in ways that are traditionally directed to the mobile device (e.g. traditional phone calls, Internet searches, transmission of SMS texts, sharing multimedia content over social networks, and the like) to engage in communications with the second mobile device 204. The first mobile device 132 may also include the second SIM 114 in the means for accepting a plurality of SIMs 114. To activate a communication session 120, user may selectively activate an application icon and upon activation, the processor 102 by way of computer executable instructions 108 activates the detection module 110 for detecting whether at least one local SIM 112 and a second SIM 114 are present in at least one means for accepting a plurality of subscriber identification modules 116, wherein both the local SIM 112 and the second SIM 114 are operable for processing communications.

Processor 102 is also configured for receiving the command for selective activation of the application program 118, wherein upon activation, starting an active communication session 120 based on the detecting of whether both at least one local SIM 112 and a second SIM 114 are present in at least one means for accepting a plurality of subscriber identification modules 116. If the detecting determines that either the local SIM 112 or the second SIM 116 is not present, the application program 118 will not be launched. For the duration of the communication session 120, the at least one processor 102 tracks communications transmitted and/or received by the communication module 104, and assign and encode the communications that are directed to/from the second SIM 114, with a unique encoding number and based on the tracking, enabling the at least one communication module 104 to route all electronic communications that include the second SIM's encoding number to be designated to or from the second SIM 114. For the duration of the communication session 120, all such communications being stored, e.g. multimedia content downloads that include the second SIM's encoding number are routed to a separate segmented portion 122 of memory 124 for storage, which solely stores content downloads related to the second SIM 114, i.e. separate and apart from any contacts, photographs and/or content stored on the mobile device 132 as initiated and/or related to the local SIM 112.

In some embodiments, the activation of the second SIM 114 does not preclude or limit incoming or outgoing voice communications being processed by the local SIM 112 while the communication session is active, as the active communication session 120 may simply be switched to background mode, such that voice communications directed to the local SIM 112 are given priority for the receipt and/or disposition thereof, thereby enabling the local SIM 112 and the second SIM 114 to work simultaneously.

In some embodiments, the data usage for the segmented portion 122 of memory 124 is tracked and may be automatically, dynamically and/or periodically adjusted in increments, e.g. 16 GB to 24 GB; 24 GB to 32 GB; 32 GB to 64 GB; 64 GB to 128 GB, and the like, wherein adjusting an allocated amount of data storage includes for example increasing data storage allocation to users who actively download content using the second SIM 114, i.e. the more data storage consumed by the user, i.e. indicating active downloads, the more data storage will be granted to the user.

In some embodiments, the reciprocal is true, adjusting the allocated amount of data storage for the segmented portion 122 of memory 124 that includes periodically decreasing allocated data storage for users who do not actively download content using the second SIM 114 to match user's data usage consumption, i.e. the less data storage used by the user, the maximum data storage previously allocated to the user will be reduced to more appropriately match the user's use. In this manner, data storage is allocated to the plurality of users to where it's needed most, without waste. In some embodiments, the advertisers pay an advertising fee for advertising using this system and method, such that the advertising fees cover the cost for user's data storage, accessibility and data consumption, making it free for the user.

Methods

Figure 3:
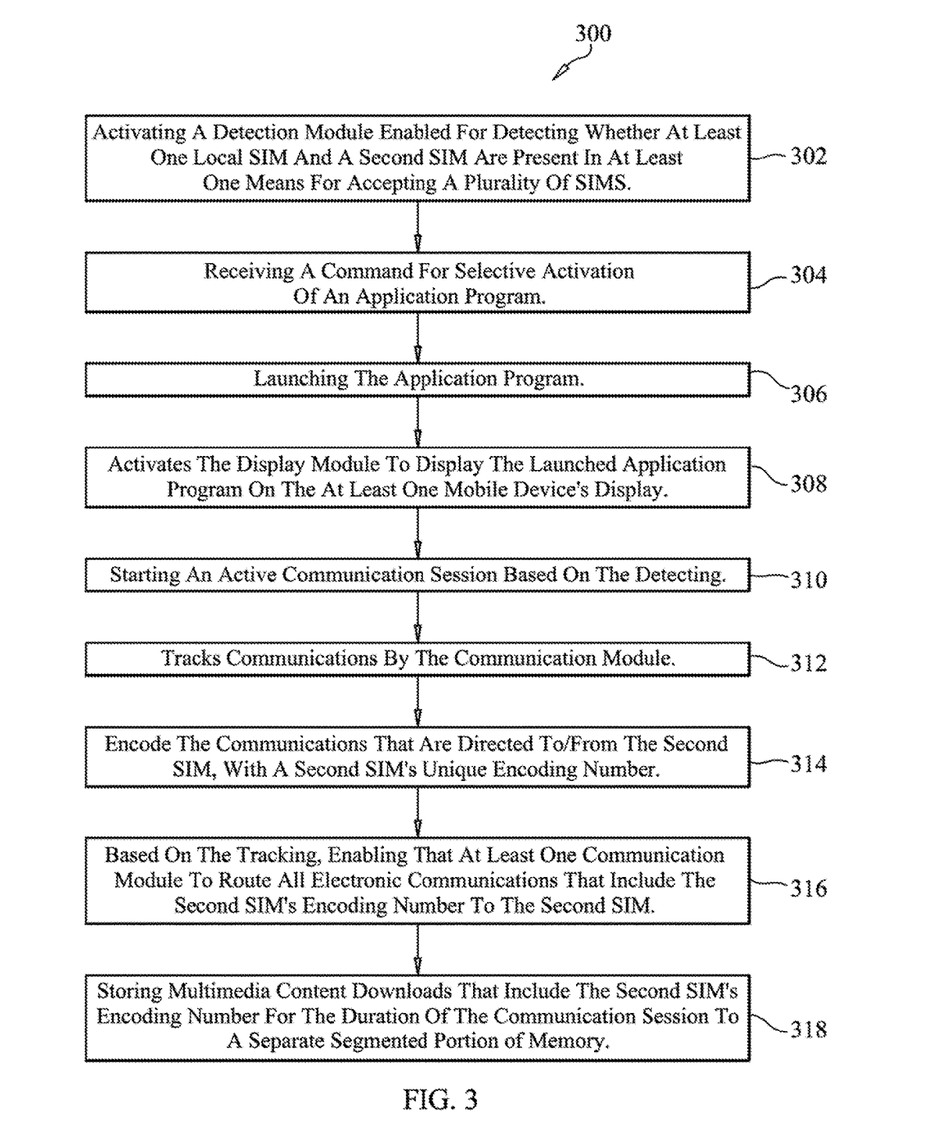
FIG. 3 shows a block diagram of a method in accordance with one embodiment of the invention.

Referring now to FIG. 3, a block diagram depicting a computer implemented method 300 is shown in accordance with one embodiment, wherein method 300 may comprise using at least one processor 102 to perform any or all of the following steps: activating a detection module 110 enabled for detecting whether at least one local SIM 112 and a second SIM 114 are present in at least one means for accepting a plurality of subscriber identification modules 116, wherein both the local SIM 112 and the second SIM 114 are operable for processing communications (block 302).

Method 300 further comprises receiving a command for selective activation of an application program 118 (block 304), launching the application program 118 (block 306), and the computer central processor 102, which is electronically connected to the displaying module 130, activates the display module 130 to display the launched application program 118 on the at least one mobile device's display (block 308). Upon activation, method 300 further comprises starting an active communication session 120 based on the detecting (block 310), wherein for the duration of the communication session 120, the at least one processor 102 tracks communications by the communication module 104 (block 312), and encode the communications that are directed to/from the second SIM 114, with a second SIM's unique encoding number (block 314), and based on the tracking, enabling the at least one communication module 104 to route all electronic communications that include the second SIM's encoding number to the second SIM 114 for processing (block 316); and storing multimedia content downloads that include the second SIM's encoding number for the duration of the communication session 120 to a separate segmented portion 122 of memory 124 for storage (step 318).

In some embodiments of the method 300, the multimedia content retrieved from for example an advertiser's site is published on the mobile device's displaying means using push notification, and/or user may use the second SIM 114 to access other advertising URLs to receive the multimedia content.

In some embodiments, method 300 further comprises tracking at least one user's data usage using the second SIM 114; and adjusting (adding or reducing) the allocated amount of data for the at least once user based on the user's use of the second SIM 114 in accordance with the adjustments previously described herein.

In some embodiments, using at least one processor comprises using computer executable instructions readable by the at least one processor. In some embodiments, the computer executable instructions may be stored, in whole or in part, remotely, such as on a server or central station, or locally, such as on a local non-transitory (or transitory) computer readable medium, wherein the local storage means may be connected to, part of, or integrated with the at least one processor and/or the mobile device. In some embodiments, the central station may be a cellular telephone/data service provider. The computer executable instructions may take the form of a downloadable application program, such as, but not limited to a mobile application program.

In some embodiments, a user may be provided with at least one local or second SIM card, as well as access to a downloadable application program. In another embodiment, the user may be provided access, or rights to purchase, the downloadable application program, and upon purchasing, downloading, or accessing the application program, may be provided a local and/or second SIM card.

In some embodiments, method 300 may implement or be a part of the various embodiments of systems 100, 200 and methods described herein, such as those described above with reference to FIGS. 1 through 2.

Figure 4:
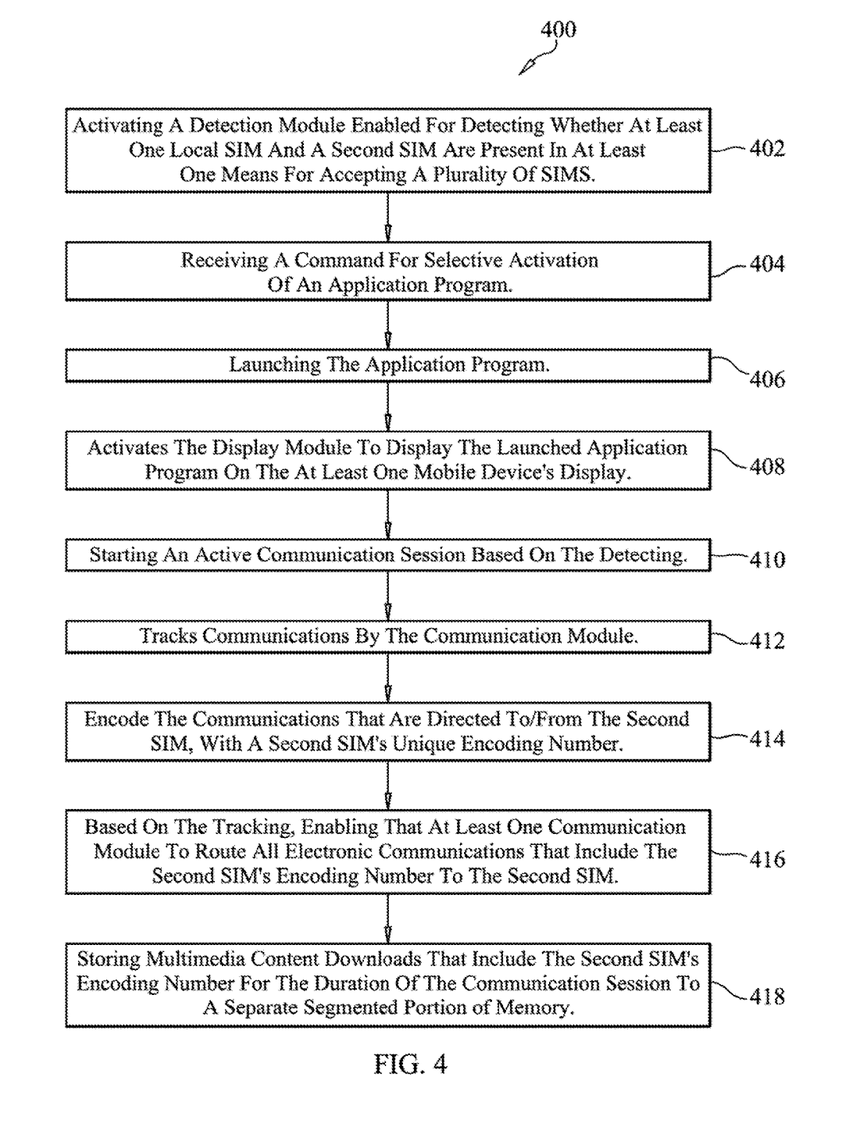
FIG. 4 shows a block diagram depicting a non-transitory computer readable medium is shown in accordance with one embodiment of the invention.

Referring now to FIG. 4, a block diagram depicting a non-transitory computer readable medium 400 is shown in accordance with one embodiment, wherein computer readable medium 400 may comprise computer executable instructions 402 readable by at least one processor 404 and operative to perform any or all of the following steps or functions: activating a detection module 110 enabled for detecting whether at least one local SIM 112 and a second SIM 114 are present in at least one means for accepting a plurality of subscriber identification modules 116, wherein both the local SIM 112 and the second SIM 114 are operable for processing communications; receiving a command for selective activation of an application program 118, launching the application program 118, activates the display module 130 to display the launched application program 118 on the at least one mobile device's display; starting an active communication session 120 based on the detecting, wherein for the duration of the communication session 120, the at least one processor 102 tracks communications by the communication module 104, and encode the communications that are directed to/from the second SIM 114, with a second SIM's unique encoding number, and based on the tracking, enabling the at least one communication module 104 to route all electronic communications that include the second SIM's encoding number to the second SIM 114 for processing; and storing multimedia content downloads that include the second SIM's encoding number for the duration of the communication session 120 to a separate segmented portion 122 of memory 124 for storage.

In some embodiments, the at least one processor 404 may be part of or integrated into a mobile device 132. In some embodiments, the mobile device 132 may comprise a mobile phone, a tablet PC, a smartphone, a laptop, and the like.

In one embodiment, the computer executable instructions 402 may be stored, in whole or in part, remotely, such as in a server or central station, or locally, such as in the mobile communications device. In some embodiments, the central station may comprise any type of central station, such as those described above with reference to FIGS. 1 through 4.

Non-transitory computer readable medium 400 may comprise any type non-transitory computer readable medium, such as, but not limited to, a hard drive, a flash drive, a solid state drive, computer memory, a compact disc, a DVD, and the like. Computer readable medium 400 may comprise any of the various embodiments described herein, such as those described with reference to FIGS. 1 through 4.

In some embodiments, computer executable instructions 402 may comprise the various embodiments of computer executable instructions described herein, such as those described above with reference to FIGS. 1-4. Computer executable instructions 402 may be part of, used in, or be included in the various systems and methods described herein.

Hardware and Operating Environment

This section provides an overview of example hardware and the operating environments in conjunction with which embodiments of the inventive subject matter can be implemented.

A software program may be launched from a computer readable medium in a computer-based system to execute the functions defined in the software program. Various programming languages may be employed to create software programs designed to implement the system 100 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
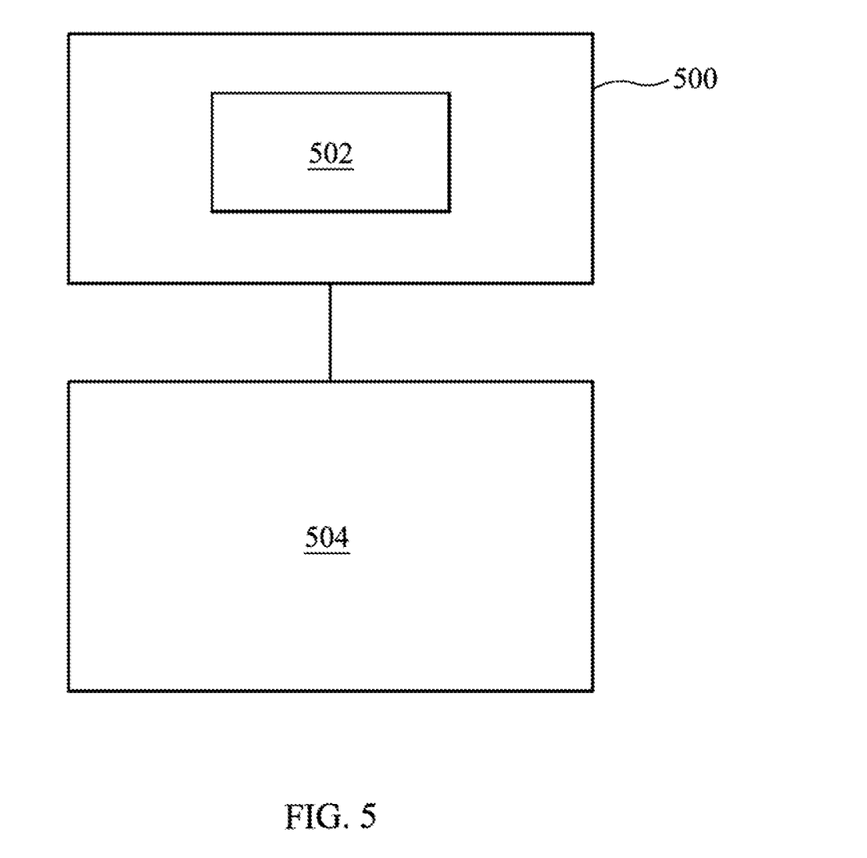
FIG. 5 is a block diagram representing an apparatus according to various embodiments.

FIG. 5 is a block diagram representing an apparatus 500 according to various embodiments. Such embodiments may comprise a computer, a memory system, a magnetic or optical disk, some other storage device, or any type of electronic device or system. The apparatus 500 may include one or more processor(s) 502 coupled to a machine-accessible medium such as a memory 504 (e.g., a memory including electrical, optical, or electromagnetic elements). The medium may contain associated information 506 (e.g., computer program instructions, data, or both) which, when accessed, results in a machine (e.g., the processor(s) 502) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
    at least one processor;
    at least one communication module electronically connected to the at least one processor, wherein said at least one communication module is operative to connect to a wireless communications network; and
    computer executable instructions executable by the at least one processor, which when executed causes the at least one processor to perform any one or more of the following:
        activating a detection module for detecting whether at least one local subscriber identification module and a second subscriber identification module are present in at least one means for accepting a plurality of subscriber identification modules, wherein both the local subscriber identification module and the second subscriber identification module are enabled to process communications;
        receiving a command for selective activation of an application program, wherein upon activation, starting an active communication session based on the detecting, wherein the duration of the active communication session, the at least one processor tracks communications by the at least one communication module, and encode the communications that are directed to/from the second subscriber identification module, with a second subscriber identification module's unique encoding number, and based on tracking based on tracking, enabling the at least one communication module to route all electronic communications that include the second subscriber identification module encoding number to the second subscriber identification module for processing; and
        storing multimedia content downloads that include the second subscriber identification module's encoding number for the duration of the communication session to a separate segmented portion of memory for storage.

2. The system of claim 1, wherein the at least one processor is part of or integrated into a mobile communications device.

3. The system of claim 1, wherein the computer executable instructions are further configured for preventing access to the segmented portion of memory if the at least one second subscriber identification module is not present in the at least one means for accepting a plurality of subscriber identification modules.

4. The system of claim 1, wherein the computer executable instructions are further configured for causing the processor to analyze all incoming and outgoing communications, isolating any remaining communications during the communication session that does not include the second subscriber identification module's encoding number and channeling them to be processed by the at least one local subscriber identification module without requiring the user to extract either subscriber identification modules from the means for accepting a plurality of subscriber identification module.

5. The system of claim 1, wherein the computer executable instructions are further configured for tracking data usage of the segmented portion of memory and adjusting an allocated amount of data storage of the segmented portion of memory.

6. The system of claim 5, wherein adjusting an allocated amount of data storage includes any one of increasing data storage allocation to users who actively download content using the second subscriber identification module; and/or decreasing allocated data storage for users who do not actively download content using the second subscriber identification module to match user's data usage consumption.

7. The system of claim 1, wherein the computer executable instructions are further configured for enabling the second subscriber identification module for processing data communications comprising multimedia content directed to or from the second subscriber identification module.

8. The system of claim 1, wherein the computer executable instructions comprise a downloadable application program.

9. A method comprising using at least one processor to perform any or all of the following steps:
   activating a detection module for detecting whether at least one local subscriber identification module and a second subscriber identification module are present in at least one means for accepting a plurality of subscriber identification modules, wherein both the local subscriber identification module and the second subscriber identification module are enabled to process communications;
   receiving a command for selective activation of an application program, wherein upon activation, starting an active communication session based on the detecting, wherein for the duration of the active communication session, the at least one processor tracks communications by the at least one communication module, and encode the communications that are directed to/from the second subscriber identification module, with a second subscriber identification module's unique encoding number, and based on tracking, enabling the at least one communication module to route all electronic communications that include the second subscriber identification module encoding number to the second subscriber identification module for processing; and
   storing multimedia content downloads that include the second subscriber identification module's encoding number for the duration of the communication session to a separate segmented portion of memory for storage.

10. The method of claim 9, further comprising preventing access to the segmented portion of memory if the at least one second subscriber identification module is not present in the at least one means for accepting a plurality of subscriber identification modules.

11. The method of claim 9, further comprising causing the processor to analyze all incoming and outgoing communications, isolating any remaining communications during the communication session that does not include the second subscriber identification module's encoding number and channeling them to be processed by the at least one local subscriber identification module without requiring the user to extract either subscriber identification modules from the means for accepting a plurality of subscriber identification module.

12. The method of claim 9, further comprising tracking data usage of the segmented portion of memory and adjusting an allocated amount of data storage of the segmented portion of memory.

13. The method of claim 12, wherein adjusting an allocated amount of data storage includes any one of increasing data storage allocation to users who actively download content using the second subscriber identification module; and/or decreasing allocated data storage for users who do not actively download content using the second subscriber identification module to match user's data usage consumption.

14. The method of claim 9, further comprising enabling the second subscriber identification module for processing data communications comprising multimedia content directed to or from the second subscriber identification module.

15. A non-transitory computer readable medium comprising:
   computer executable instructions readable by at least one processor and operative to perform any or all of the following steps or functions:
   activating a detection module for detecting whether at least one local subscriber identification module and a second subscriber identification module are present in at least one means for accepting a plurality of subscriber identification modules, wherein both the local subscriber identification module and the second subscriber identification module are enabled to process communications;
   receiving a command for selective activation of an application program, wherein upon activation, starting an active communication session based on the detecting, wherein for duration of the active communication session, the at least one processor tracks communications by the at least one communication module, and encode the communications that are directed to/from the second subscriber identification module, with a second subscriber identification module's unique encoding number, and based on tracking, enabling the at least one communication module to route all electronic communications that include the second subscriber identification module encoding number to the second subscriber identification module for processing; and
   storing multimedia content downloads that include the second subscriber identification module's encoding number for the duration of the communication session to a separate segmented portion of memory for storage.

16. The method of claim 15, wherein the at least one processor is part of or integrated into a mobile communications device.

17. The method of claim 16, wherein the mobile communications device is a mobile phone.

\* \* \* \* \*